United States Patent Office 3,005,783
Patented Oct. 24, 1961

3,005,783
POLYETHER RESINS
Richard H. F. Manske, Archie E. Ledingham, and Walter R. Boos, Guelph, Ontario, Canada, assignors to United States Rubber Company, New York, N.Y., a corporation of New Jersey
No Drawing. Filed Oct. 12, 1959, Ser. No. 845,637
19 Claims. (Cl. 260—2)

This invention relates to a resinous material and to a method of making the same, and more particularly it relates to the preparation of a novel polyether resin by condensation of a bifunctional bis(diarylcarbinol) with a different bifunctional alcohol containing an aliphatic residue.

One object of the invention is to produce a resin useful as a surface coating or for making shaped bodies.

Another object is to provide a resinous material that resists deterioration by the action of alkalis.

Still another object is the provision of an improved surface coating for concrete and the like.

Yet another object is to make a resinous material that is non-brittle.

A further object is to make a resin that is chemically resistant and resistant to weathering Additional objects and advantages of the invention will be made manifest in the following detailed description.

In accordance with the invention, a bifunctional bis-(diarylcarbinol) is condensed with a different bifunctional dialcohol containing an aliphatic residue, thereby producing a flexible, chemically resistant resin which can be used as a surface coating or for other purposes.

The bifunctional bis(diarylcarbinols) employed in the invention include those of the formulas

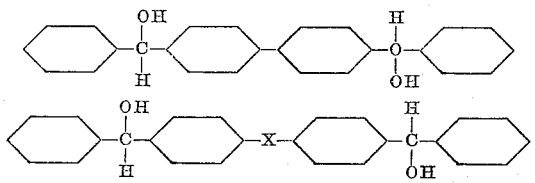

where X is —O—; —O—(CRR')$_n$—O—; or
—(CRR')$_n$— the R's standing for H, CH$_3$ or aliphatic chains (especially lower alkyl groups), which are substituted or non-substituted and which may contain 1–10 carbon atoms. The R's within the units may or may not be identical and furthermore may or may not be different in their compositions from unit to unit. The $n$ should be an integer having a value from 1 to 5. Thus suitable bifunctional bis(diarylcarbinols) include 4,4'-bis(alpha-hydroxybenzyl)diphenyl, represented by the first structural formula given above; 4,4' - bis(alpha - hydroxybenzyl)diphenyl ether; 4,4' - bis(alpha-hydroxybenzyl) - 1,2 - diphenoxyethane; [p,p' - bis(alpha - hydroxybenzyl) - 2,3 - diphenyl]-5-methylhexane; 1,2-bis(para-alpha-hydroxybenzyl)-1,1,2,2-tetramethylethane; p,p'-bis(alpha-hydroxybenzyl)-1,5-diphenylpentane and [p,p'-bis(alpha-hydroxybenzyl)-1,3-diphenyl]-2,2-dimethylpropane.

As indicated the invention contemplates condensing a bifunctional bis(diarylcarbinol) of the foregoing kind with a different bifunctional alcohol containing an aliphatic chain with the elimination of water. Such a different bifunctional alcohol containing an aliphatic chain may be an alpha-omega aliphatic diol, having for example from 3 to 20 carbon atoms (e.g. 1,3-propanediol; 1,6-hexanediol; 1,7-heptanediol; 1,10-decanediol). However it is not essential that the hydroxy groups of such a diol should be located on the end of the hydrocarbon chain nor is it essential that the hydrocarbon chain be a straight chain (e.g. 1,4-pentanediol or 2,11-dimethyldodecane-4,9-diol). Furthermore, the different bifunctional alcohols need not be purely aliphatic but may contain cyclic structures, including aromatic structures, as long as the compounds contain two or more aliphatic residues from one to twenty carbon atoms in length to which the hydroxyl group may be attached in any manner with the restriction that these groups should be at least 4 carbon atoms (usually from 4 to 25 carbon atoms) apart.

For purposes of the invention, such chemicals will be referred to as aliphatic bifunctional alcohols. Among alcohols of this kind may be mentioned alpha, alpha-p-xylene-diol; alpha, alpha-dimethyl-4,4'-bis(betahydroxyethoxy)diphenylmethane; alpha, alpha-dimethyl-4,4'-bis(gamma- (or beta-) hydroxypropoxy)diphenylmethane; 3,6-dimethyl-4-octyne-3,6-diol; 2,5 - dimethyl - 3 - hexyne-2,5-diol; the "Surfynols" 102 and 104 of the general structural formula

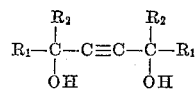

where R$_1$ and R$_2$ are hydrogen or lower alkyl (1 to 10 carbon atoms) and may be the same or different. (The last four compounds are commercially available from the Air Reduction Chemical Company, 150 East 42nd Street, New York 17, N.Y.); the commercial materials known as "Polyglycol P250" and "Polyglycol P400" (manufactured by the Dow Chemical Company, Midland, Michigan, and described in the bulletin "Dow Polypropylene Glycols" published by this company); 4,4'-bis(1-hydroxypentyl)-diphenyl ether; 4,4'-bis(1-hydroxyheptyl)diphenyl ether; 4,4'-bis(1-hydroxyundecyl)diphenyl ether; bis(2-beta-hydroxy ethoxy-3,5-dinonylphenyl)methane.

Also suitable are polyethylene sulfides containing terminal hydroxyl groups of molecular weight 400–2000, such as the commercially available material known as "Zl–184," "ZL–185" and "ZC–123" supplied by Thiokol Corporation, Trenton, New Jersey, and described in the New Product Bulletins numbers ZL–184, ZL–185, and ZC–123, published by this company; and a commercially available glycol known as "Emery 3105 R Dimer Glycol" supplied by Emery Industries Inc., Carew Tower, Cincinnati 2, Ohio, which is dimerized and reduced linoleic acid of the formula

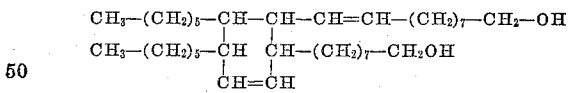

In practicing the invention, the bifunctional bis(diarylcarbinol) is simply admixed with the different bifunctional alcohol containing an aliphatic chain, usually in such proportions that there are from 50 to 90 moles of the aliphatic diol, per 100 moles of the diarylcarbinol. To bring about reaction between these materials, they are usually heated to an elevated temperature, say at least to a temperature of about 80° C., and preferably to a temperature above 100° C., frequently at a temperature of 120° to 180° C., although even higher temperatures, such as 200° C., may be used if desired. In a preferred practice of the invention, the reaction is catalyzed by those materials usually used to promote elimination of water in condensation or esterification reactions, notably acidic materials, such as mineral acids, p-toluene sulfonic acid, boron trifluoride, stannic chloride, titanium tetrachloride, trichloroacetic acid, and trifluoroacetic acid, which are used in the usual small, catalytic amounts. For convenience in removing the water formed in the course of the reaction, the reaction mix may include a suitable entraining agent, such as an organic solvent which forms with water an azeotrope having a boiling point which is in the neighborhood of the desired reaction temperature, and which is below the boiling points of the diarylcarbinol and the aliphatic diol. The common organic solvents such as xylene, benzene or toluene are suitable for this purpose.

Condensation of the bifunctional bis(diarylcarbinol) with the different bifunctional alcohol containing an aliphatic chain, by elimination of water, results in the formation of the resinous product of the invention, which has a polyether structure, that is, the various molecules of the starting materials become attached to each other through the medium of oxygen ether linkages. Depending on the relative proportions of bifunctional bis(diarylcarbinol) and the different bifunctional aliphatic alcohols, the resin molecule may contain diarylcarbinol residues alternating with aliphatic alcohol residues (the residues being linked to each other by oxygen atoms), or there may occur various random arrangements of chains of a plurality of diarylcarbinol residues, linked by oxygen atoms, with regularly or irregularly singularly interspersed aliphatic alcohol residues. The length of the resinous polymer chain may vary, depending on the duration of the reaction, the severity of the reaction conditions, the concentration of catalyst and the kind of catalyst, and other process variables. Useful products are usually obtained within reaction times varying from 1 hour to 12 hours, and it is possible to follow the progress of the reaction by separating and measuring the amount of water produced. The products obtained may vary from 3000 to 20,000 in molecular weight.

In some cases we dissolve the diarylcarbinol and the aliphatic diol in a more polar solvent, such as nitrobenzene, nitromethane, nitroethane or nitropropane in their pure state or mixed with some other suitable solvent like carbon tetrachloride or chloroform. These solvents or mixtures of solvents promote by their specific character the efficiency of the above mentioned acidic catalysts and furthermore may in some cases dissolve the monomeric diarylcarbinols and aliphatic diols whereas the polymeric condensation products are partly or fully insoluble in such mediums.

Products obtained by this polymerization procedure can be isolated by steam distilling the solvent, thus separating it from the polymer, and redissolving the product in a suitable different solvent like toluene or xylene.

In accordance with a preferred but optional practice of the invention, there is included in the reaction mixture a small amount, such as from 1 to 5 moles of different polyfunctional alcohols, per 100 moles of the bis(diarylcarbinol). Such alcohols may be purely aliphatic like pentaerythritol; 2 - hydroxymethyl - 2 - methyl-1,3-propanediol (commercially available under the name "Trimet" from the Trojan Powder Company, Allentown, Pennsylvania); 2,2-dihydroxymethyl-1-butanol (commercially available from the Celanese Corporation of America under the name "Trimethylolpropane"); and 1,2,6-hexanetriol. Other polyfunctional alcohols which may serve the same purpose are partly esterified, polymeric, polyfunctional, aliphatic alcohols such as polyvinyl alcohol (e.g. the commercial materials known as "Elvanol" 71–30 and 50–40, commercially available from E. I. Du Pont de Nemours and Company (Inc.) Electrochemicals Department, and which are described in the booklet "Elvanol Polyvinyl Alcohols" issued by this company); or ethyl cellulose (e.g. the products known as N–14 and N–50, supplied commercially by the Hercules Powder Company, Cellulose Products Department, Wilmington 99, Delaware, and described in the bulletin "Ethyl Cellulose" published by this company). These polyfunctional alcohols need not be fully aliphatic but may contain aromatic structures as long as the hydroxyl groups are attached to the aliphatic part of these molecules. An alcohol representing this class would be the "Resinous Polyol X–450" (commercially available from the Shell Chemical Corporation Market Development Department, 50 West 50th Street, New York 20, N.Y. and described in the technical information booklet issued by this company under the codes MD–115 and MD–116).

These polyfunctional alcohols bring about to some extent cross-linking within the polymers into which they are incorporated and thus enhance their chemical resistance.

Example I

To make a diarylcarbinol suitable for use in the invention, 38 grams (1/10 mole) of p,p'-dibenzoyldiphenyl ether, M.P. 164° C.

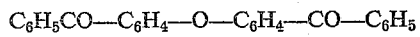

(J. pr. Chem. [2] 117, 353), 150 cc. of peroxide-free dioxane, about 5 g. of Raney nickel catalyst and 3 pellets of potassium hydroxide (about 1 gram) are placed in a bomb and shaken at a temperature of about 70° C. while hydrogen gas is introduced. After about 5 hours the theoretical quantity of hydrogen (1/5 mole to prepare the dicarbinol) has been taken up. The liquid is decanted from the catalyst and the dioxane is distilled off. The residue, a heavy oil, is taken up in hot toluene and washed with hot water until free of alkali. From the somewhat concentrated solution of toluene there separates on cooling a white crystalline product melting at 140° C.

*Analysis.*—Found 82.14%; C., 5.65%; H., calculated 81.6% C., 5.76% H.

There remains in solution in the toluene another form of the product which can be recovered by fractional recrystallization from benzene. It is obtained as a crystalline compound melting at 96–97° C. and contains ½ mol of benzene of crystallization. After drying in a high vacuum at 78° C. the melting point is 101–102° C.

*Analysis.*—Found 81.45% C. and 5.93% H.

Both forms of the product are insoluble in water and will dissolve in chloroform readily from which they can be crystallized in the form of fine colorless needles. The product is 4,4'-bis(alpha-hydroxybenzyl)diphenyl ether:

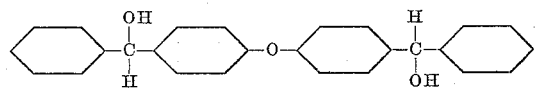

It is believed to be a new chemical.

In accordance with the invention, a useful resin is made by heating 100 grams of the foregoing dicarbinol in a three liter flask with 50 grams of Emery glycol 3105–R (chemical identity given above) and 600 cc. of xylene, along with 1.4 grams of pentaerythritol and 10 mg. of p-toluene sulfonic acid, at a temperature of about 140° C. The solution is refluxed for about 5 hours, with an overhead device to catch and remove water from the condensate. The amount of water recovered is 6.6 cc. 300 cc. of xylene are then evaporated, leaving a resin-like material having the consistency of paint. If more of the xylene is taken off, the resin gels, and it is very hard to dissolve the resin again. It can be redissolved with difficulty in anisol. The paint-like residue is painted on an aluminum panel and allowed to dry at 100° C. by simple evaporation of the solvent. The resulting coating is highly resistant to water, and shows no adverse effect after being immersed in water for a number of weeks. The resinous product with solvent can be painted onto concrete, and makes a permanent, adhering coating which is not adversely affected by weather.

In the foregoing example, the pentaerythritol may be omitted, and substantially equivalent results are obtained by following the same procedure, except that a slightly softer product is obtained.

The resinous coating thus obtained is remarkable for its resistance to alkalis. The resinous coating is useful for coating the interiors of pipes or tanks used in handling aqueous caustic.

Example II

The procedure of the foregoing example is repeated, except that the starting material has the following formula:

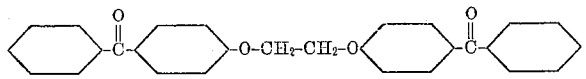

The systematic name of this ketone is p,p'-dibenzoyl-1,2-diphenoxyethane (Kostanecki, Lampe and Marshalk, B. 40, 3664 (1908) melting point 195° C.). It is converted into the corresponding dicarbinol in the exact manner previously indicated. Recrystallization from benzene yields fine needles melting at 111° C. and analysis indicates that ½ mole of benzene is present. It is dried at 78° C. under vacuum and it was noted that the material shrank and lost 8.42% in weight. Calc. loss of ½ mole of benzene is 8.39%. The dried sample is recrystallized from chloroform as fine needles which melt at 86–87° C. Analysis of this compound gives carbon 78.79, 78.61%, hydrogen 6.52, 6.48% and it requires 78.87% carbon and 6.10% hydrogen.

The structural formula is as follows:

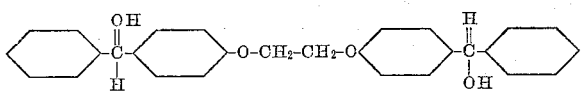

The systematic name of this compound is 4,4'-bis(alpha-hydroxybenzyl)-1,2-diphenoxyethane. This corresponds to that reported by Druey, Bull. Soc. Chem., [5]2, 1737–41 (1935). Considerable material remains in the mother liquors which does not crystallize readily.

To prepare a resin of the invention 42.6 grams of the foregoing bis(hydroxybenzyl)diphenoxyethane is heated in a reaction vessel equipped with a dephlegmator, along with 4.34 grams of 1,10-decanediol, 8.3 grams of alpha,alpha-dimethyl-4,4'-bis-[gamma - hydroxy - propoxy]-diphenylmethane, 150 cc. of toluene and 0.1 cc. of boron trifluoride ether complex or 10 mg. of p-toluene sulfonic acid at a temperature of about 110° C. The solution is refluxed for about 2 hrs. during which time 2.4 cc. of water are collected. 50 cc. of toluene are then evaporated, leaving a resin like material having the consistency of paint and being light brown in color. This resin is painted on an aluminum panel and allowed to dry at 100° C. by simple evaporation of the solvent. The resulting coating is highly resistant to water and completely unaffected when immersed into a solution of 10% aqueous solution of sodium hydroxide for a period of 25 days. It showed good flexibility properties. The resinous product with solvent exhibited good flow properties and releases the solvent easily. It can be painted onto concrete or any other masonry making a permanently adhering coating which is not adversely affected by weather.

Example III

The procedure of Example I is repeated except that the starting ketone has the formula

The systematic name of this chemical is 4,4'-dibenzoyl-diphenyl. It is a known chemical (Wolf, N., B. 14, 2031 (1881)) and melts at 218° C. It is converted into the corresponding dicarbinol by the following procedure: 48 grams of the 4,4'-dibenzoyldiphenyl, 150 cc. of peroxide free dioxane, about 5 g. of Raney nickel catalyst and about 1 g. of solid potassium hydroxide are placed in a bomb and shaken at a temperature of 60–70° C. while hydrogen gas is introduced. After about 3 hrs. the theoretical quantity of hydrogen has been taken up. The catalyst is removed from the liquid by filtration and the dioxane is evaporated under reduced pressure. The residue is taken up in hot toluene and washed with hot water until free from alkali.

From the concentrated toluene solution on cooling there separate white crystalline needles which when recrystallized from chloroform melt at 185°. The compound analyzed for carbon 85.76, 85.69%; hydrogen 5.93, 5.66%. Calc. for $C_{26}H_{22}O_2$ carbon 85.41%; hydrogen 5.95%. This compound has the following structural formula

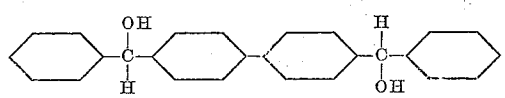

The systematic name is 4,4'-bis(alpha-hydroxybenzyl)diphenyl and it is believed to be a new chemical.

To prepare a resin of the invention the procedure of Example I may be repeated, using this new diarylcarbinol, or the following procedure may be followed: 36.6 grams of the foregoing bis(hydroxybenzyl)diphenyl is heated in a reaction vessel equipped with a dephlegmator, along with 8.5 grams of 3,6-dimethyl-4-octyne-3,6-diol, 3.5 grams of 2,5-dimethyl-3-hexyne-2,5-diol, 150 cc. of toluene and 0.1 cc. of boron trifluoride phenol complex, or 10 mg. of p-toluene sulfonic acid at a temperature of about 110° C. The solution is refluxed for about 2 hrs. during which time 3.15 cc. of water are collected. 50 cc. of toluene are then evaporated, leaving a resin like material having the consistency of paint and being light brown in color. This resin is painted on an aluminum panel showing good flow properties and releasing the solvent easily when dried at 80–90° C. The resulting coating presents no tackiness up to a temperature of 60° C. and is rather flexible. It shows excellent resistance to water and alkaline solutions. Optionally, 0.6 gram of "Polyol X-450" may be included in this preparation.

Example IV 1,2-bis(p-benzoylphenyl)-1,1,2,2-tetramethylethane was prepared from dicumyl by the classical Friedel-Crafts reaction in the following manner: 190 grams (0.8 mole) of dicumyl and 300 cc. of dry nitro benzene are placed in a 3 l. three necked flask fitted with a stirrer, a thermometer and a dropping funnel and surrounded by a cooling bath. The mixture is cooled to 20° C. or less and 234 grams anhydrous aluminum chloride is added at such a rate that the temperature does not rise above 20° C. during the addition. Then 248 grams of benzoylchloride is added under stirring through the dropping funnel at a rate that the temperature does not rise above 20° C. The mixture is subsequently allowed to warm to room temperature and stands for 48 hours. The reaction mixture is decomposed with ice and nitrobenzene is removed by steam distillation. The sticky residue is extracted with aqueous alkaline solution to remove the aluminum hydroxide. After washing several times with water by decantation, benzene is added and the remainder of the water is removed by azeotropic distillation. More benzene is added to bring about solution of the product and this solution is clarified by filtration. A part of the benzene is then distilled off and about an equal volume of acetone is added and the crystalline material separates and is recovered by filtration. Yield 185–199 grams.

The resulting chemical has the following structural formula:

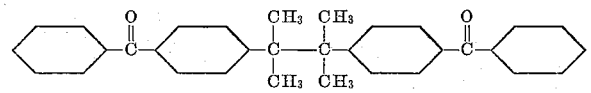

and is believed to be a new chemical. It is obtained as colorless rhombic plates. The analysis gives the following result: carbon 85.83, 85.93%; hydrogen, 6.34, 6.81%. Calc. for $C_{32}H_{30}O_2$ carbon 86.10%; hydrogen, 6.73%. The systematic name of this compound is 1,2-bis(p-benzoylphenyl)-1,1,2,2-tetramethylethane.

This compound is converted into the corresponding dicarbinol by the following procedure: 45 g. (0.1 mole) of the 1,2-bis(p-benzoylphenyl)-1,1,2,2-tetramethylethane is suspended in 150 cc. of peroxide-free dioxane, about 5 grams of Raney nickel catalyst and about 1 g. of potassium hydroxide are added and the mixture placed in a bomb and shaken at a temperature of about 70° C. while hydrogen gas is introduced. After about 5 hours the theoretical quantity of hydrogen (0.2 mole) is taken up. The liquid is filtered from the catalyst and most of the dioxane is distilled off. The residue is taken up in hot toluene and washed with hot water until free of alkali. From the somewhat concentrated toluene solution there separates on cooling a colorless crystalline material. Recrystallized from chloroform petroleum ether this compound yields fine colorless needles melting at 149° C. Analyzed for $C_{32}H_{34}O_2$ requires carbon 85.33%; hydrogen 7.56%. Found: carbon 84.48, 84.67%; hydrogen 7.43, 7.07%. This compound believed to be new, has the structural formula:

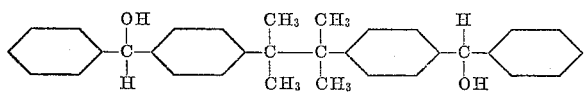

The systematic name of this compound is 1,2-bis(p-alpha-hydroxy-benzylphenyl)-1,1,2,2-tetramethylethane.

To prepare a resin of the invention the procedure of Example I may be repeated, substituting the foregoing aryl dicarbinol, or the following procedure may be used: 29.2 g. of the foregoing 1,2-bis(p-alpha-hydroxybenzylphenyl)-1,1,2,2-tetramethylethane is heated in a reaction vessel equipped with a stirrer and a reflux condenser along with 8 g. of 3,6-dimethyl-4-octyne-3,6-diol, 50 cc. of carbontetrachloride, 50 cc. of nitromethane and 0.1 cc. of boron trifluoride ether complex or 10 mg. of p-toluene sulfonic acid under stirring at a temperature of 80 to 90° C. After one hour the mixture is steam distilled until all of the solvents are recovered. After decantation of the supernatant water the resinous residue is dissolved in toluene and the remaining water is distilled off by azeotropic distillation. Optionally 5 g. of "Surfynol 104" may be included in making this preparation.

The resin-like material has the consistency of paint and is light yellow in color. When painted on an aluminum panel it shows good flow properties and releases the solvent easily when dried at 90 to 100° C. After drying for 20 minutes this coating is not tacky at 100° C. and is rather flexible at room temperature. The dried resin exhibits a high gloss and shows excellent resistance to water and aqueous alkali solution and no deterioration of the coating was noticed after immersing a coated panel for 10 days into such solutions.

Having thus described our invention, what we claim and desire to protect by Letters Patent is:

1. 4,4'-bis(alpha-hydroxybenzyl)diphenyl.
2. 4,4'-bis(alpha-hydroxybenzyl)diphenyl ether.
3. 1,2 - bis(p - alpha - hydroxy-benzylphenyl)-1,1,2,2-tetramethylethane.
4. Chemicals selected from the group consisting of chemicals of the formulas

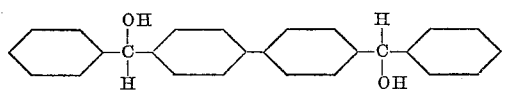

and

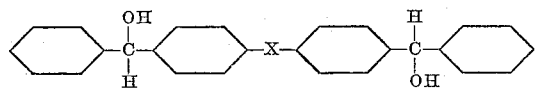

wherein X is selected from the group consisting of O, —O— (CRR')$_n$—O— and (CRR')$_n$ where R and R' are selected from the group consisting of hydrogen and lower alkyl groups and $n$ is an integer from 1 to 5.

5. A polyether resin which is a polyether of (A) a bifunctional bis (diarylcarbinol) selected from the group consisting of those of the formulas

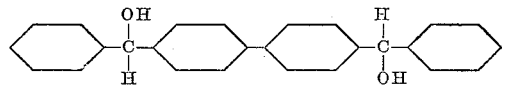

and

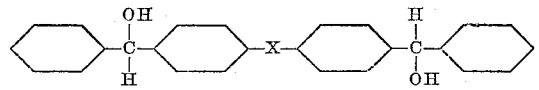

wherein X is selected from the group consisting of O, —O—(CRR')$_n$—O— and (CRR')$_n$, where R and R' are selected from the group consisting of hydrogen and lower alkyl groups and $n$ is an integer from 1 to 5, with (B) a different polyhydric alcohol wherein the hydroxyl groups are attached to aliphatic carbon atoms and are at least 4 carbon atoms apart, in relative proportions of from 50 to 90 moles of (B) per 100 moles of (A).

6. A resin as in claim 5 in which (A) is 4,4'-bis(alpha-hydroxybenzyl)diphenyl.

7. A resin as in claim 5 in which (A) is 4,4'-bis(alpha-hydroxybenzyl)diphenyl ether.

8. A resin as in claim 5 in which (A) is 1,2-bis(p-alpha - hydroxy - benzylphenyl) - 1,1,2,2 - tetramethylethane.

9. A resin as in claim 5 in which (A) is 4,4'-bis(alpha-hydroxybenzyl)diphenyl and (B) has the formula

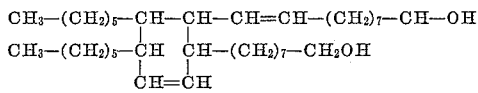

10. A resin as in claim 5 in which (A) is 4,4'-bis-(alpha-hydroxybenzyl)diphenyl and (B) is 1,10-decanediol.

11. A resin as in claim 5 in which (A) is 4,4'-bis-(alpha-hydroxybenzyl)diphenyl and (B) is alpha-dimethyl - 4,4' - bis(gamma - hydroxypropoxy) - diphenylmethane.

12. A resin as in claim 5 in which (A) is 4,4'-bis-(alpha-hydroxybenzyl)diphenyl and (B) is 3,6-dimethyl-4-octyne-3,6-diol.

13. A resin as in claim 5 in which (A) is 4,4'-bis-(alpha-hydroxybenzyl)diphenyl and (B) is 2,5-dimethyl-3-hexyne-2,5-diol.

14. A resin as in claim 5 in which (A) is 4,4'-bis-(alpha-hydroxybenzyl)diphenyl ether and (B) has the formula

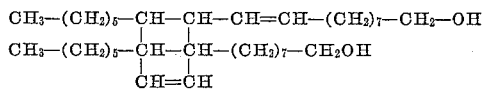

15. A resin which is a reaction product of (A) and (B) as in claim 14, and (C), pentaerythritol.

16. A resin as in claim 5, in which (A) is 4,4'-bis-(alpha-hydroxybenzyl)-1,2-diphenoxyethane, and (B) is a mixture of 1,10-decanediol and alpha, alpha-dimethyl-4,4'-bis(gamma-hydroxypropoxy)-diphenylmethane.

17. A resin as in claim 5, in which (A) is 4,4'-bis-(alpha-hydroxybenzyl)diphenyl and (B) is a mixture of 3,6 - dimethyl - 4 - octyne - 3,6 - diol and 2,5 - dimethyl-3-hexyne-2,5-diol.

18. A resin as in claim 5, in which (A) is 1,2-bis(p-alpha - hydroxy - benzylphenyl) - 1,1,2,2 - tetramethylethane and (B) is 3,6-dimethyl-4-octyne-3,6-diol.

19. A method of making a polyether resin comprising heating together (A) a bifunctional bis(diarylcarbinol) selected from the group consisting of those of the formulas

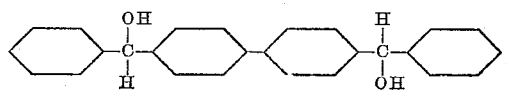

and

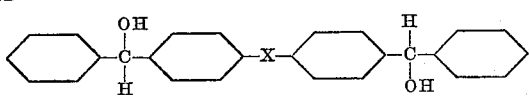

wherein X is selected from the group consisting of O, —O—$(CRR')_n$—O— and $(CRR')_n$, where R and R' are selected from the group consisting of hydrogen and lower alkyl groups and $n$ is an integer from 1 to 5, with (B) a different polyhydric alcohol wherein the hydroxyl groups are attached to aliphatic carbon atoms and are at least 4 carbon atoms apart, in the presence of a condensation catalyst, in relative proportions of from 50 to 90 moles of (B) per 100 moles of (A).

References Cited in the file of this patent
UNITED STATES PATENTS

| | | |
|---|---|---|
| 2,465,486 | Rosenthal | Mar. 29, 1949 |
| 2,614,107 | Wender et al. | Oct. 14, 1952 |
| 2,873,275 | Ramsden | Feb. 10, 1959 |

OTHER REFERENCES

De Milt et al.: Jour. Amer. Chem. Soc., vol. 62, pp. 1954–1955 (1940).